May 12, 1964     P. T. HERMAN     3,132,915

PROPOSED SYSTEM FOR RECORDING STATIC AND DYNAMIC DATA

Filed Jan. 30, 1963

INVENTOR.
PAUL THEODORE HERMAN
BY

Arthur N. Collins

ATTORNEY

3,132,915
PROPOSED SYSTEM FOR RECORDING STATIC AND DYNAMIC DATA
Paul Theodore Herman, R.D. 1, Mertztown, Pa.
Filed Jan. 30, 1963, Ser. No. 255,137
1 Claim. (Cl. 346—1)
(Granted under Title 35, U.S. Code (1952), sec. 266)

The invention described herein may be manufactured and used by or for the Government of the United States of America for governmental purposes without the payment of any royalties thereon or therefor.

The present invention relates to a novel and improved method for recording and analyzing data and more particularly to a unique technique for recording and analyzing data which is automatic and reliable in operation.

In the design of various types of aircraft and the like it is often necessary to simultaneously record numerous parameters such as air temperature, air pressure, acceleration, and stress and strain at many points throughout the aircraft as they vary under actual flight conditions. The resulting mass of data has in the past generally been collected and recorded in the form of a plurality of oscillograph traces during flight. Thereafter laborious visual extraction of specific data and information from the many traces is necessary in order to formulate valid design conclusions. This process, however, has been found to be a time consuming process and one prone to the introduction of many errors.

It is therefore a principal object of the present invention to provide a novel and improved method of recording and analyzing data which eliminates the laborious and error prone visual extraction and interpretation of collected data.

It is a further object of the present invention to provide a novel and improved automatic technique of recording and analyzing data which is light in weight and therefore readily adaptable for use in flight studies.

Other objects and many of the attendant advantages of this invention will be readily appreciated as the same becomes better understood by reference to the following detailed description when considered in connection with the accompanying drawing wherein.

Figure 1:
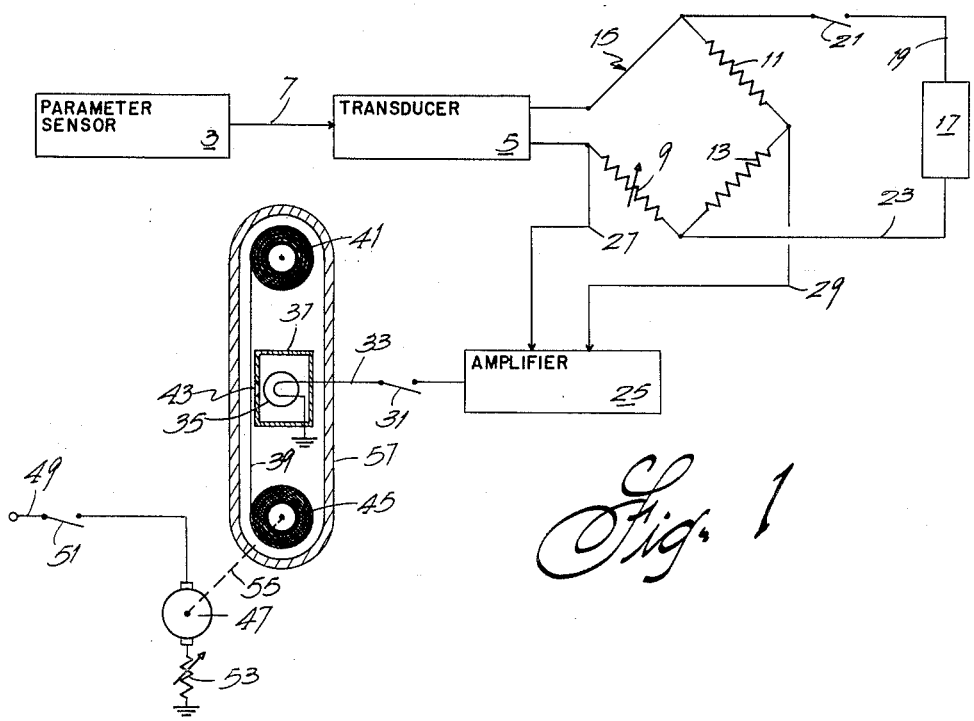
FIGURE 1 is a diagrammatic view of a preferred embodiment of data recording apparatus used in performing the improved method of the present invention.

As shown in FIGURE 1 of the drawing the sensor devide or probe 3, which senses the parameter to be monitored, is coupled to the transducer 5 in any suitable manner depending on the nature of the parameter. Thus, for example, if the exterior air pressure at a particular point on an aircraft in flight is to be monitored, the sensor 3 preferably takes the form of a suitable Pitot tube and is connected to the pressure transducer 5 through the tubing or the like 7. The transducer 5, which develops an electrical potential proportional to the varying magnitude of the parameter, together with the variable resistor 9, and resistors 11 and 13, form the various arms of the conventional bridge network 15. One terminal of the source of electrical energy 17 is coupled to the junction of resistor 11 and transducer 5 through conductor 19 and switch 21. The other terminal of source 17 is connected to the junction of resistors 9 and 13 through conductor 23. The junction of transducer 5 and variable resistor 9 is coupled to amplifier 25 through conductor 27 and the junction of resistors 11 and 13 is coupled to the amplifier 25 through conductor 29. The output circuit of amplifier 25 extends from the amplifier through switch 31, conductor 33 and lamp 35 to ground.

The container on box 37, which is preferably painted black inside and out, houses lamp 35 as shown. Film 39 is guided in any suitable manner from reel 41 past the aperture 43 in box 37 to take-up reel 45. Motor 47 is energized by a circuit that extends from power supply line 49 through the power switch 51 the armature of the motor and speed control resistor 53 to ground. Motor 47 drives reel 45 through the linkage mechanism diagrammatically shown in the drawing at 55. Reel 41, film 39, box 37 and reel 45 are positioned as shown within the housing 57, which is preferably painted black inside and out.

Figure 2:
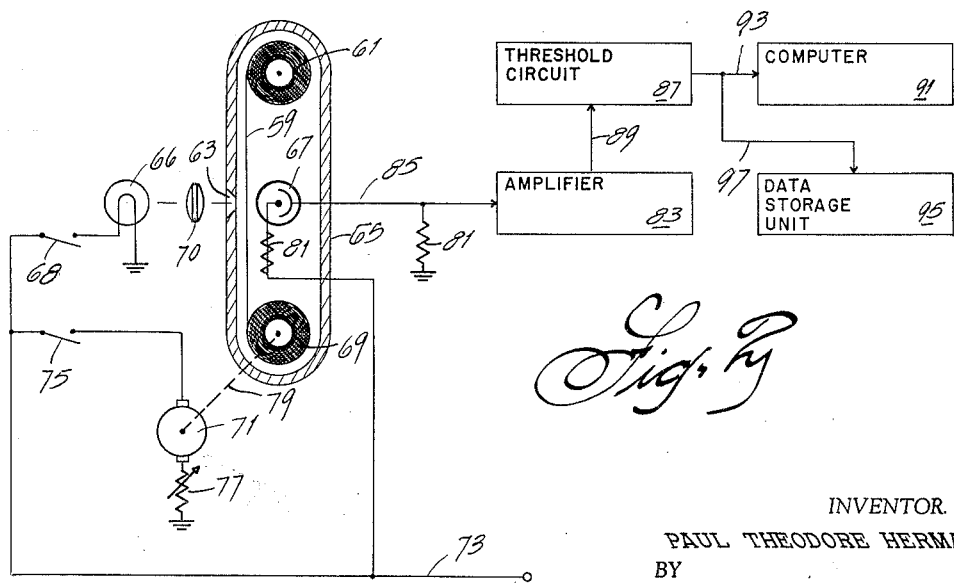
FIGURE 2 is a diagrammatic view of a preferred embodiment of read-out apparatus used in performing the improved method of the present invention.

A preferred embodiment of the read-out apparatus used in the present invention is illustrated in FIGURE 2 of the drawing. As shown therein, developed film 59 is guided from reel 61 between the aperture 63 in housing 65 and the photoelectric cell 67 mounted within the housing 65 to the take-up reel 69. The interior of housing 65 is painted black. Lamp 66 is energized by a circuit that extends from power supply line 73 through switch 68 and the lamp to ground. The lens device or the like 70 is positioned between the lamp 66 and housing 65 so as to focus light from the lamp through aperture 63 onto the film 59. Motor 71 is energized by a circuit that extends from power supply line 73 through power switch 75, the armature of motor 71 and speed control resistor 77 to ground. Motor 71 drives reel 69 through the linkage mechanism diagrammatically shown at 79. Photoelectric cell 67 is energized by a circuit that extends from the power supply line 73 through the cell and through resistor 81 to ground. The junction of the cathode of cell 67 with resistor 81 is connected to amplifier 83 through conductor 85. The output circuit of amplifier 83 is coupled to the threshold circuit 87 through conductor 89. Threshold circuit 89 is of any conventional design such as a one shot multivibrator circuit. The output circuit of the multivibrator or the like is coupled to the computer 91 through conductor 93 and to the data storage unit 95 through conductor 97. The specific design of the computer 91 of itself forms no part of the invention and as will be more apparent hereinafter will vary depending upon the nature of the data analysis to be performed. Similarly, the data storage unit 95 may be of any conventional design or type such as a magnetic tape recorder or the like without departing from the spirit or scope of the invention.

In carrying out the improved method of the invention switch 21 is closed and variable resistor 9 is adjusted such that when the parameter to be monitored is a predetermined value the bridge 15 is balanced and no signal is applied to amplifier 25. As the parameter varies thereafter, proportionate changes of electrical potential are developed in transducer 5 and a corresponding unbalance in the bridge is produced. When switch 31 is closed, the signal from the bridge 15 is fed through amplifier 25 to lamp 35. In this way the intensity of light emitted from lamp 35 varies as the value of the parameter to be monitored varies. Switch 51 is then closed to energize motor 47, and resistor 53 is adjusted to control the transfer of film 39 from reel 41 to take-up reel 45. Film 39 is therefore exposed to the light of variable intensity from lamp 35 as it passes aperture 43 in box 57. The film is then developed.

When the data recorded in this way is to be analyzed, switches 75 and 68 are closed to energize motor 71 and lamp 66, and resistor 77 is adjusted to control the transfer of the developed film 59 from reel 61 to take-up reel 69. In so doing film 59 passes aperture 63 in housing 65 and permits varying amounts of light from lamp 66 and lens 70 to energize the photoelectric cell 67. The resultant variable plate current through cell 67 and cathode resistor 81 provides a varying potential that is amplified in amplifier 83 and applied to threshold circuit 87 such that its one shot multivibrator fires when the amplitude of the signal from amplifier 83 exceeds a predetermined level. When the multivibrator of threshold circuit 87 fires, the resultant output pulse is either recorded on a suitable tape recorder mechanism or the like in the data storage unit 95 for future use or it is fed directly into the computer 91 for immediate analysis of the data.

Obviously many modifications and variations of the present invention are possible in the light of the above teachings. It is therefore to be understood that within the scope of the appended claims the invention may be practiced otherwise than as specifically described.

What is claimed is:

A method of recording and analyzing data relating to the operation of an aircraft during actual flight conditions and requiring the use of equipment of minimum complexity and weight, said method comprising:

(a) sensing changes of a parameter of interest on the aircraft while in flight;

(b) converting the changes in the sensed parameter into a varying electrical potential in equipment located on the aircraft;

(c) controlling the intensity of a light source with variation in the electrical potential in equipment located on the aircraft;

(d) exposing film to energy from the light source in equipment located on the aircraft;

(e) developing the film after the aircraft has returned to its base;

(f) directing light into a photoelectric cell in accordance with the degree of exposure of the developed film in equipment located on the ground;

(g) and coupling the output of the photoelectric cell to a computer for predetermined data analysis in equipment also located on the ground.

References Cited in the file of this patent

UNITED STATES PATENTS

| | | |
|---|---|---|
| 2,726,131 | Skelton | Dec. 6, 1955 |
| 2,769,683 | Skelton | Nov. 6, 1956 |
| 2,777,354 | Stickney et al. | Jan. 15, 1957 |
| 2,783,118 | Owen | Feb. 26, 1957 |
| 2,791,288 | Meier | May 7, 1957 |
| 2,898,574 | Palmer | Aug. 4, 1959 |
| 2,944,620 | Van Dijck | July 12, 1960 |
| 2,950,459 | Loper et al. | Aug. 23, 1960 |
| 2,951,736 | Black | Sept. 6, 1960 |
| 3,011,856 | Palmer et al. | Dec. 5, 1961 |
| 3,034,127 | Walling et al. | May 8, 1962 |
| 3,040,322 | Mahanel et al. | June 19, 1962 |
| 3,050,731 | Usdin | Aug. 21, 1962 |
| 3,072,889 | Willcox | Jan. 8, 1963 |